United States Patent
Han et al.

(10) Patent No.: US 9,244,548 B2
(45) Date of Patent: Jan. 26, 2016

(54) TERMINAL DEVICE

(71) Applicant: Lenovo (Beijing) Co., Ltd., Beijing (CN)

(72) Inventors: Feng Han, Beijing (CN); Xiufeng He, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 164 days.

(21) Appl. No.: 13/760,479

(22) Filed: Feb. 6, 2013

(65) Prior Publication Data

US 2013/0207897 A1   Aug. 15, 2013

(30) Foreign Application Priority Data

Feb. 10, 2012   (CN) .......................... 2012 1 0030946

(51) Int. Cl.
*G06F 3/041* (2006.01)
*G06F 1/16* (2006.01)

(52) U.S. Cl.
CPC ................ *G06F 3/041* (2013.01); *G06F 1/169* (2013.01); *G06F 1/1616* (2013.01); *G06F 1/1677* (2013.01)

(58) Field of Classification Search
CPC ....... G06F 3/041; G06F 3/044; G06F 1/1616; G06F 1/1677; G06F 1/169
USPC .................... 345/156–174; 178/18.01–18.11; 361/679.04, 679.06, 679.14, 679.15, 361/679.27, 679.28, 579.3, 679.55, 679.6
See application file for complete search history.

(56) References Cited

U.S. PATENT DOCUMENTS

| | | | |
|---|---|---|---|
| 6,259,597 B1 * | 7/2001 | Anzai et al. .............. | 361/679.55 |
| 7,663,877 B2 | 2/2010 | Goto | |
| 2002/0063518 A1 * | 5/2002 | Okamoto et al. ............. | 313/506 |
| 2004/0090430 A1 * | 5/2004 | Kong ............................ | 345/173 |
| 2005/0040753 A1 * | 2/2005 | Osame et al. ................. | 313/500 |
| 2005/0208807 A1 * | 9/2005 | Lin ............................... | 439/165 |
| 2006/0133047 A1 * | 6/2006 | Tomizuka et al. ........... | 361/716 |
| 2006/0146488 A1 * | 7/2006 | Kimmel ....................... | 361/681 |
| 2007/0120762 A1 * | 5/2007 | O'Gorman ................... | 345/1.1 |
| 2010/0182265 A1 * | 7/2010 | Kim et al. .................... | 345/173 |
| 2011/0260997 A1 * | 10/2011 | Ozaki .......................... | 345/173 |

(Continued)

FOREIGN PATENT DOCUMENTS

CN         101055490         10/2007

OTHER PUBLICATIONS

First Office Action dated Sep. 30, 2015 out of corresponding Chinese priority Application No. 201210030946.3 (19 pages including English translation).

*Primary Examiner* — Hong Zhou
(74) *Attorney, Agent, or Firm* — Brinks Gilson & Lione; G. Peter Nichols

(57) ABSTRACT

A terminal device is provided with a first casing, configured to accommodate the display part of the terminal device; a second casing, configured to accommodate the computation part and the heat dissipation part of the terminal device; a first shaft, provided on one side of the second casing, configured to be connected to the first casing and the second casing, with the first casing being able to rotate clockwise or counterclockwise around the axis of the first shaft; and a touch sensing unit, connected to the first shaft and configured to detect touch inputs from the user, wherein the touch sensing unit is provided between the first casing and the second casing and rotates clockwise or counterclockwise around the first shaft.

11 Claims, 1 Drawing Sheet

(56) References Cited

U.S. PATENT DOCUMENTS

2011/0285636 A1* 11/2011 Howard et al. ............... 345/173
2012/0235949 A1* 9/2012 Ligtenberg .................... 345/174
2012/0327570 A1* 12/2012 Tang et al. ............... 361/679.01

* cited by examiner

TERMINAL DEVICE

This application claims priority to Chinese patent application No. CN 201210030946.3 filed on Feb. 10, 2012, the entire contents of incorporated herein by reference.

The present invention relates to a terminal device, and more particularly to a terminal device with a flexible input manner.

BACKGROUND

Nowadays, with the development of the touch technology, more and more terminal devices, such as notebooks, have touch functions. For example, some notebooks have keyboards and touch screens, thereby allowing users to input with keyboards or by touching. However, the costs of the notebooks described above are high. Further, in some notebooks, a touch screens is also provided on the host portion (body) of the notebook and a virtual keyboard is displayed on the touch screen so as to enable the user to input with the soft keyboard by way of touch. However, since two display screens are provided in the above-described notebook, it is difficult to control the thickness of the notebook, and the two display screens are bound to increase the cost and power consumption of the notebook.

SUMMARY

In order to address the above technical problem, according to one aspect of the present invention, A terminal device is provided, comprising: a first casing, configured to accommodate the display part of the terminal device; a second casing, configured to accommodate the computation part and the heat dissipation part of the terminal device; a first shaft, provided on one side of the second casing, configured to be connected to the first casing and the second casing, and the first casing being able to rotate clockwise or counterclockwise around the axis of the first shaft; and a touch sensing unit, connected to the first shaft and configured to detect touch inputs from the user, wherein the touch sensing unit is provided between the first casing and the second casing and is able to rotate clockwise or counterclockwise around the first shaft.

Further, according to an embodiment of the present invention, wherein when the touch sensing unit contacts the first casing, the touch sensing unit at least covers part of the display screen so as to form a touch screen together with the display screen to receive touch operations.

Further, according to an embodiment of the present invention, wherein when the touch sensing unit contacts the second casing, the touch sensing unit separates from the display part and the touch sensing unit is used as an input unit of the terminal device.

Further, according to an embodiment of the present invention, wherein the input unit is a virtual keyboard unit.

Further, according to an embodiment of the present invention, wherein the input unit is a virtual joysticks unit.

Further, according to an embodiment of the present invention, wherein a preset pattern is provided on the touch sensing unit so as to prompt the user with the content that can be input through the touch sensing unit.

Further, according to an embodiment of the present invention, wherein the surface area of the touch sensing unit matches the first casing and the second casing.

Further, according to an embodiment of the present invention, wherein the touch sensing unit is connected to the computation part in the second casing through a flexible printed circuit in the first shaft.

Further, according to an embodiment of the present invention, wherein the touch sensing unit further comprises: a first touch sensing unit, provided on the first surface of the touch sensing unit and configured to detect the touch input of the user on the first surface; and a second touch sensing unit, provided on the second surface of the touch sensing unit and configured to detect touch input of the user on the second surface, wherein when the touch sensing unit contacts the first casing, the first surface overlaps the third surface of the first casing; and when the touch sensing unit contacts the second casing, the second surface overlaps the fourth surface of the second casing.

Further, according to an embodiment of the present invention, wherein when the touch sensing unit contacts the first casing, the touch input on the second surface of the user is detected through the second touch sensing unit; and when the touch sensing unit contacts the second casing, the touch input on the first surface of the user is detected through the first touch sensing unit.

Further, according to an embodiment of the present invention, wherein the terminal device further comprises: a touch sensing unit control unit, connected to the first touch sensing unit and the second touch sensing unit and configured to control the power supply of the first touch sensing unit and the second touch sensing unit, wherein when the touch sensing unit contacts the first casing, the touch sensing unit control unit cuts off the power supply of the first touch sensing unit; and when the touch sensing unit contacts the second casing, the touch sensing unit control unit cuts off the power supply of the second touch sensing unit.

DETAILED DESCRIPTION

Figure 1:
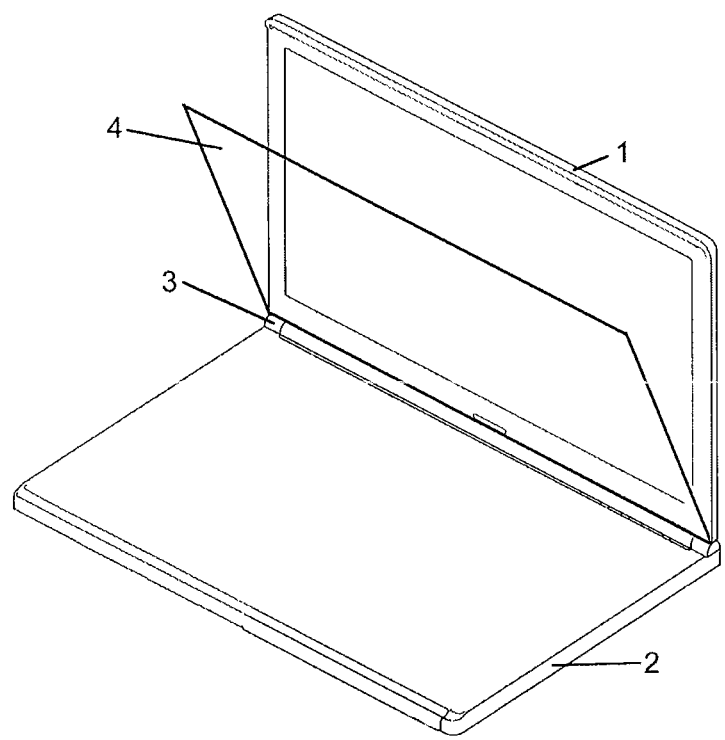
FIG. 1 is a schematic block diagram illustrating the terminal device according to an embodiment of the present invention.

Each embodiment according to the present invention will be described with reference to the drawings. Herein, it should be noted that, in the drawings, the same reference numerals are given to the parts with substantially the same or similar structures and functions, and their repeated descriptions will be omitted.

The terminal device according to the embodiment of the present invention will be described below with reference to FIG. 1. Herein, the terminal device according to the embodiment of the present invention can be a notebook.

As shown in FIG. 1, the terminal device according to an embodiment of the present invention can include a first casing 1, a second casing 2, a shaft 3 and a touch sensing unit 4.

Herein, the first casing 1 can accommodate the display part (e.g., a liquid crystal display, such as a TFT, SLCD, OLED, etc.) of the terminal device, and can be made of any plastic or metal material. Here, the first casing 1 and the display part are used as the display portion of the terminal device.

The second casing 2 can accommodate the computation part and the heat dissipation part of the terminal device. Here, the computation part of the terminal device can comprise electronics components relating to data processing and computing, such as a motherboard, processors, graphics processors and micro-controllers. The heat dissipation part can comprise a heat sink or a fan provided close to the processors and/or graphic processors for heat dissipation. Here, the second casing 2, the computation part, and the heat dissipation part are used as the host portion of the terminal device.

The shaft 3 can be provided on one side of the second casing 2, and is connected to the first casing 1 and the second casing 2. For example, the shaft 3 can be fixed on the second casing 2, and can rotate around its axis, so that the first casing 1 can rotate clockwise or counterclockwise around the axis of shaft 3 to open or close the terminal device.

The touch sensing unit 4 can be connected to the shaft 3. Here, the touch sensing unit 4 can be implemented by any transparent touch sensing film or touch sensing board (e.g., the capacitance-type touch sensing film or touch sensing board) and related detection circuit, and can detect touch inputs from the user. It can provide the data related to the user's touch input to the computation part (such as, the processor) of the terminal device. According to an embodiment of the present invention, the touch sensing unit 4 can be provided between the first casing 1 and the second casing 2, and can rotate clockwise or counterclockwise around the axis of the shaft 3. That is, the touch sensing unit 4 formed by the touch sensing film or the touch sensing board can rotate around the axis of the shaft 3 clockwise or counterclockwise, so that the touch sensing unit 4 can overlap one surface (i.e., the surface where the display screen of the display part is) of the first casing 1 and one surface of the second casing 2 (i.e., the upper surface of the second casing 2 when the terminal device is laid flat) respectively. In addition, the touch sensing unit 4 can be connected to computation part of the terminal device through a flexible printed circuit in the shaft 3 so as to transmit data to it.

In this case, when the touch sensing unit 4 contacts the first casing 1 around the shaft 3, the touch sensing unit 4 can contact (overlap) the surface (where the display screen is located) of the first casing 1. Therefore, the touch sensing unit 4 at least covers part of the display screen so as to form a touch screen together with the display screen to receive touch operations. According to one embodiment of the present invention, the area of the touch sensing unit 4 can match the first casing 1 or the second casing 2. For example, the area of the touch sensing unit 4 can be equal to or slightly smaller than the area of the corresponding contact surface of the first casing 3 or the second casing 4. In this case, the touch sensing unit 4 can completely cover the display screen of the display part provided within the first casing 1. Here, since the touch sensing unit 4 can be implemented by any transparent touch sensing film or touch board, the image displayed on the display screen will not be blocked if the touch sensing unit 4 is placed on the display screen, and the touch input from the user can also be received. Therefore, the display screen and the touch sensing unit 4 together can form the touch screen. Here, preset touch software can be set in the terminal device, so that when the display screen and the touch sensing unit 4 together form a touch screen, the computation part determines the position where the user touches on the touch screen under the control of the touch software based on the touch position of the user obtained by the touch sensing unit 4 and determines the corresponding operation based on the position. For example, when the user touches an icon, a corresponding program or application and so on corresponding to the icon is executed.

In addition, in the case where the touch sensing unit 4 rotates around the axis of the shaft 3 clockwise or counterclockwise so as to contact (overlap) the upper surface of the second casing 2, the touch sensing unit 4 is separate from the display part (display screen) in the first casing 1. In this case, the touch sensing unit 4 can also be used as an input unit of the terminal device. For example, in the case where the touch sensing unit 4 contacts (overlaps) the upper surface of the second casing 2, the touch sensing unit 4 used as the input unit can be used as a virtual keyboard unit of the terminal device. Further, in the case where the touch sensing unit 4 contacts (overlaps) the upper surface of the second casing 2, the touch sensing unit 4 used as the input unit can be a virtual joysticks unit. Specifically, which input unit the touch sensing unit 4 should be used can be determined based on the software provided in the terminal device. For example, in the case where virtual key input software is pre-installed in the terminal device, the computation part can determine which key the user presses based on the user's touch position obtained by the touch sensing unit 4 and the preset virtual keyboard layout, and generates a key input related to the key. Furthermore, in the case where virtual joysticks software is pre-installed in the terminal device, under the control of the virtual joysticks software, the computation part can determine how to operate the virtual joysticks (such as, the arrow keys or function keys) and generate the input related to virtual handle operation, based on the user touch position obtained by the touch sensing unit 4 and the preset virtual joysticks layout. In this case, according to one embodiment of the present invention, a preset pattern (e.g., a keyboard pattern, a joysticks pattern) can be provided on the touch sensing unit 4 so as to prompt the user with the content that can be input through the touch sensing unit 4. In addition, according to another embodiment of the present invention, a preset pattern (e.g., a keyboard pattern, a handle pattern) can be set on the upper surface of the second casing so as to prompt the user with the content that can be input through the touch sensing unit 4.

The case where the touch sensing unit 4 contacts the surface where the display screen of the first casing 1 is located and the case where the touch sensing unit 4 contacts the upper surface of the second casing 2 are described. Herein, the terminal device can judge which casing the touch sensing unit 4 contacts in a variety of ways. For example, since the user uses the touch screen only when the terminal device is open (in the use state of a notebook), the angle between the touch sensing unit 4 and the second casing 2 and the angle between the first casing 1 and the second casing 2 can be detected to determine whether the user make the touch sensing unit 4 contact a specific surface (the surface of the display screen) of the first casing 1. If the terminal device detects the angle between the touch sensing unit 4 and the second casing 2 is equal to the angle between the first casing 1 and the second casing 2, the terminal device determines that the user makes the touch sensing unit 4 contact the surface of the display screen of the first casing 1, whereas if the terminal device detects the angle between the touch sensing unit 4 and the second casing 2 is zero, the terminal device determines that the user makes the touch sensing unit 4 contact the upper surface of the second casing 2. Here, the angle between the touch sensing unit 4 and the second casing 2 can be determined by the rotational travel of the connection part of the shaft 3. In addition, according to another embodiment of the present invention, the shaft 3 can be configured so that when the user makes the touch sensing unit 4 contact the surface of the display screen of the first casing 1, a control signal is activated (for example, the connecting parts the two overlap and are turned on, etc.), so as to notify the processor of the terminal device that the user makes the touch sensing unit 4 contact the surface of the display screen of the first casing 1. In addition, the shaft 3 can be configured so that when the user makes the touch sensing unit 4 contact the upper surface of the second casing 2, a control signal is activated (for example, the connecting parts of the two overlap and are turned on, etc.), so as to notify the processor of the terminal device that the user makes the touch sensing unit 4 contact the upper surface of the display screen of the second casing 2. Furthermore, as long as the terminal device can determine which one of the surface of the display screen of the first case 1 and the upper surface of the second casing 2 the touch sensing unit 4 contacts, the present invention is not limited to the above-described method.

With the above configuration, a touch sensing unit 4 is provided between the first casing 1 and the second casing 2 and is used as different input units when the touch sensing unit 4 contacts the surface of the display screen of the first casing 1 or the upper surface of the second casing 2. Thus, the touch sensing unit 4 can be made to play different roles as needed, so as to make the terminal device have the functions of a touch screen and a virtual keyboard or joysticks. In addition, since the touch sensing unit 4 can be used as a virtual keyboard when it contacts the upper surface of the second casing 2, a keyboard unit is not needed on the second casing 2. Thus, the thickness of the second casing 2, which is used as a host part, can be further reduced, so as to reducing the overall thickness of the terminal device.

Exemplary embodiments according to the present invention are described above. However, the present invention is not limited thereto. For example, since the touch sensing unit 4 implemented by a touch sensing film or a touch sensing board has a short the sensing distance for the user's touch, the thickness of the touch sensing unit 4 is small, so the intensity of the touch sensing unit 4 may be affected. Thus, according to another embodiment of the present invention, the touch sensing unit 4 can also be implemented by two touch sensing units.

Figure 2:
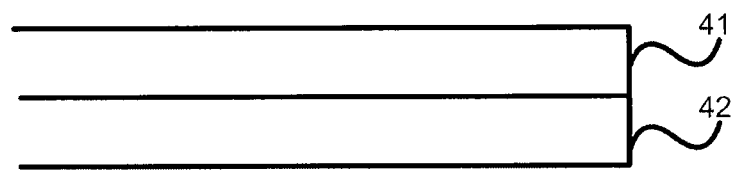
FIG. 2 is a schematic diagram illustrating the structure of a touch sensing unit according to another embodiment of the present invention.

FIG. 2 is a schematic diagram illustrating the structure of the touch sensing unit according to another embodiment of the present invention.

As shown in FIG. 2, the touch sensing unit 4 can further comprise a first touch sensing unit 41 and a second touch sensing unit 42.

The first touch sensing unit 41 can be provided on the first surface of the touch sensing unit 4. The first touch sensing unit 41 can detect the touch input of the user on the first surface, and provide the data related to the user's touch input for the processor of the terminal device. The second touch sensing unit 42 can be provided on the second surface of the touch sensing unit 4. Here, in the case where the first touch sensing unit 41 and the second touch sensing unit 42 are implemented by transparent touch sensing films, the second touch sensing unit 42 can detect the user's touch input on the second surface, and the first touch sensing unit 41 and the second touch sensing unit 42 can be provided on the first surface and the second surface of the transparent thin board. In addition, in the case that the first touch sensing unit 41 and the second touch sensing unit 42 are implemented by transparent touch sensing boards, the first touch sensing unit 41 and the second touch sensing unit 42 can be combined to form the touch sensing unit 4. The data related to the user's touch input are provided for the processor of the terminal device. Here, when the touch sensing unit 4 contacts the first casing 1, the first surface overlaps (contacts) the surface of the display screen of the first casing 1, whereas when the touch sensing unit 4 contacts the second casing 2, the second surface overlaps (contacts) the upper surface of the second casing 2.

In this case, when the touch sensing unit 4 contacts the first casing 1 (the surfaces of the display screen), since the first surface of the touch sensing unit 4 contacts the surface of the display screen of the first casing 1 and the user can contact the second surface of the touch sensing unit 4, the touch input on the second surface of the user can be detected through the second touch sensing unit 42 provided on the second surface. In addition, when the touch sensing unit 4 contacts the upper surface of the second casing 2, since the second surface of the touch sensing unit 4 contacts the upper surface of the second casing 2 and the user can contact the first surface of the touch sensing unit 4, the touch input on the first surface of the user can be detected through the first touch sensing unit 41 provided on the first surface. Herein, since the procedure during which the terminal device judges which one of the first casing 1 and the second casing 2 contacts the touch sensing unit 4 is the same to the previous description for FIG. 1, it is thus omitted here.

In addition, according to another embodiment of the present invention, in order to make the first touch sensing unit 41 and the second touch sensing unit 42 do not affect each other, the touch sensing unit 4 can further comprise a touch sensing unit control unit (not shown). The touch sensing unit control unit can be connected to the first touch sensing unit 41 and the second touch sensing unit 42, and can be implemented by any electronic switch. The touch sensing unit control unit can control the power supply of the first touch sensing unit 41 and the second touch sensing unit 42. For example, when the terminal device judges that the touch sensing unit 4 is in contact with the surface of the display screen of the first casing 1, the touch sensing unit control unit can cut off the power supply of the first touch sensing unit 41 based on the control signal provided by the computation part (e.g., a processor) of the terminal device. In this case, only the second touch sensing unit 42 works to detect the user's touch input on the second surface. In addition, when the terminal device judges that the touch sensing unit 4 is in contact with the upper surface of the second casing 2, the touch sensing unit control unit can cut off the power supply of the second touch sensing unit 42 based on the control signal provided by the computation part (e.g., a processor) of the terminal device. In this case, only the first touch sensing unit 41 works to detect the user's touch input on the first surface.

Various embodiments of the present invention are described above in detail. However, those skilled in the art can understand that various modifications, combinations or sub-combinations on these embodiments can be made without departing from the principle and spirit of the present invention, and such modifications shall fall within the scope of the present invention.

What is claimed is:
1. A terminal device, comprising:
a first casing, configured to accommodate a display part of the terminal device;
a second casing, configured to accommodate a computation part and a heat dissipation part of the terminal device;
a first shaft, provided on one side of the second casing, configured to be connected to the first casing and the second casing, and the first casing being able to rotate clockwise or counterclockwise around an axis of the first shaft; and
a touch sensing unit, connected to the first shaft and configured to detect touch inputs from the user,
wherein the touch sensing unit is provided between the first casing and the second casing and is able to rotate clockwise or counterclockwise around the first shaft and when the touch sensing unit is contacted with the first casing or the second casing, the first shaft is configured to activate a control signal to notify the computation part of the contact between the touch sensing unit and the first casing or the second casing, and
wherein whether the touch sensing unit is contacted with the first casing or the second casing is detected by an angle between the touch sensing unit and one of the first casing and the second casing and an angle between the first casing and the second casing.

2. The terminal device according to claim 1, wherein when the touch sensing unit contacts the first casing, the touch sensing unit covers at least a part of a display screen so as to form a touch screen together with the display screen to receive touch operations.

3. The terminal device according to claim 1, wherein when the touch sensing unit contacts the second casing, the touch sensing unit separates from the display part and the touch sensing unit is used as an input unit of the terminal device.

4. The terminal device according to claim 3, wherein the input unit is a virtual keyboard unit.

5. The terminal device according to claim 3, wherein the input unit is a virtual joystick unit.

6. The terminal device according to claim 3, wherein a preset pattern is provided on the touch sensing unit so as to prompt the user with a content input through the touch sensing unit.

7. The terminal device according to claim 1, wherein a surface area of the touch sensing unit matches the first casing and the second casing.

8. The terminal device according to claim 1, wherein the touch sensing unit is connected to the computation part in the second casing through a flexible printed circuit in the first shaft.

9. The terminal device according to claim 8, wherein the touch sensing unit further comprises:

a first touch sensing unit, provided on a first surface of the touch sensing unit and configured to detect a touch input of the user on the first surface; and a second touch sensing unit, provided on a second surface of the touch sensing unit and configured to detect a touch input of the user on the second surface, wherein when the touch sensing unit contacts the first casing, the first surface overlaps a third surface of the first casing; and when the touch sensing unit contacts the second casing, the second surface overlaps the fourth surface of the second casing.

10. The terminal device according to claim 9, wherein when the touch sensing unit contacts the first casing, the touch input on the second surface of the touch sensing unit is detected through the second touch sensing unit; and when the touch sensing unit contacts the second casing, the touch input on the first surface of the touch sensing unit is detected through the first touch sensing unit.

11. The terminal device according to claim 10, further comprising a touch sensing unit control unit, connected to the first touch sensing unit and the second touch sensing unit and configured to control the power supply of the first touch sensing unit and the second touch sensing unit, wherein when the touch sensing unit contacts the first casing, the touch sensing unit control unit cuts off a power supply of the first touch sensing unit; and when the touch sensing unit contacts the second casing, the touch sensing unit control unit cuts off a power supply of the second touch sensing unit.

* * * * *